United States Patent
Hu et al.

(10) Patent No.: US 11,255,670 B2
(45) Date of Patent: Feb. 22, 2022

(54) MEMS GYROSCOPE SELF-TEST USING A TECHNIQUE FOR DEFLECTION OF THE SENSING MOBILE MASS

(71) Applicant: STMicroelectronics, Inc., Coppell, TX (US)

(72) Inventors: Yamu Hu, Allen, TX (US); Deyou Fang, Frisco, TX (US); David Mcclure, Carrollton, TX (US); Huantong Zhang, Coppell, TX (US); Naren K. Sahoo, Frisco, TX (US)

(73) Assignee: STMicroelectronics, Inc., Coppell, TX (US)

( * ) Notice: Subject to any disclaimer, the term of this patent is extended or adjusted under 35 U.S.C. 154(b) by 205 days.

(21) Appl. No.: 16/452,967

(22) Filed: Jun. 26, 2019

(65) Prior Publication Data

US 2020/0408524 A1 Dec. 31, 2020

(51) Int. Cl.
*G01C 19/5719* (2012.01)
*H04L 27/38* (2006.01)

(52) U.S. Cl.
CPC ...... *G01C 19/5719* (2013.01); *H04L 27/3863* (2013.01)

(58) Field of Classification Search
CPC ............ G01C 19/5719; G01C 19/5712; H04L 27/3863; H04L 27/364
See application file for complete search history.

(56) References Cited

U.S. PATENT DOCUMENTS

| | | |
|---|---|---|
| 5,351,519 A | 10/1994 | Kress |
| 6,029,516 A | 2/2000 | Mori et al. |
| 6,427,518 B1 | 8/2002 | Miekley et al. |
| 6,564,637 B1 | 5/2003 | Schalk et al. |
| 7,155,979 B2 | 1/2007 | Lasalandra et al. |
| 8,476,970 B2 | 7/2013 | Mokhtar et al. |
| 9,714,842 B2 | 7/2017 | Anac et al. |
| 9,846,037 B2 | 12/2017 | Aaltonen |
| 10,760,910 B2 | 9/2020 | Gando et al. |
| 2005/0016273 A1 | 1/2005 | Murata et al. |
| 2005/0264366 A1* | 12/2005 | Zivanovic ............... H03B 5/06 331/16 |

(Continued)

OTHER PUBLICATIONS

Ganesh K. Balachandran et al.: "A 3-Axis Gyroscope for Electronic Stability Control With Continuous Self-Test," IEEE Journal of Solid State Circuits, 2016, pp. 1-10.

(Continued)

*Primary Examiner* — Herbert K Roberts
*Assistant Examiner* — John M Royston
(74) *Attorney, Agent, or Firm* — Crowe & Dunlevy

(57) ABSTRACT

A microelectromechanical system (MEMS) gyroscope sensor has a sensing mass and a quadrature error compensation control loop for applying a force to the sensing mass to cancel quadrature error. To detect fault, the quadrature error compensation control loop is opened and an additional force is applied to produce a physical displacement of the sensing mass. A quadrature error resulting from the physical displacement of the sensing mass in response to the applied additional force is sensed. The sensed quadrature error is compared to an expected value corresponding to the applied additional force and a fault alert is generated if the comparison is not satisfied.

24 Claims, 4 Drawing Sheets

(56) References Cited

U.S. PATENT DOCUMENTS

| | | |
|---|---|---|
| 2005/0268716 A1 | 12/2005 | Krovat et al. |
| 2006/0280202 A1 | 12/2006 | Kelly |
| 2007/0084270 A1 | 4/2007 | Jarrett |
| 2007/0169551 A1 | 7/2007 | Kelly |
| 2008/0190199 A1 | 8/2008 | Prandi et al. |
| 2010/0307243 A1 | 12/2010 | Prandi et al. |
| 2011/0146402 A1 | 6/2011 | Donadel et al. |
| 2011/0146403 A1 | 6/2011 | Rizzo Piazza Roncoroni et al. |
| 2011/0197674 A1 | 8/2011 | Prandi et al. |
| 2011/0254599 A1 | 10/2011 | Dikshit et al. |
| 2012/0312095 A1 | 12/2012 | Hanson et al. |
| 2013/0268227 A1 | 10/2013 | Opris et al. |
| 2013/0271228 A1 | 10/2013 | Tao et al. |
| 2013/0283908 A1 | 10/2013 | Geen et al. |
| 2014/0190258 A1 | 7/2014 | Donadel et al. |
| 2014/0250970 A1 | 9/2014 | Fang et al. |
| 2014/0250971 A1 | 9/2014 | Fang et al. |
| 2015/0033821 A1 | 2/2015 | Mangano |
| 2015/0177775 A1* | 6/2015 | Beaulation ............... G01D 5/14 327/160 |
| 2015/0185011 A1 | 7/2015 | Beaulaton et al. |
| 2015/0226556 A1 | 8/2015 | Aaltonen |
| 2015/0280949 A1 | 10/2015 | Cornibert et al. |
| 2016/0010994 A1 | 1/2016 | Ackerman |
| 2016/0103174 A1 | 4/2016 | Aaltonen et al. |
| 2016/0349056 A1 | 12/2016 | Thompson et al. |
| 2017/0168088 A1 | 6/2017 | Coronato et al. |
| 2017/0227569 A1 | 8/2017 | Alwardi et al. |
| 2017/0328712 A1 | 11/2017 | Collin et al. |
| 2018/0038692 A1 | 2/2018 | Prati et al. |
| 2018/0335446 A1 | 11/2018 | Choi et al. |
| 2019/0025056 A1 | 1/2019 | Hughes et al. |
| 2019/0145773 A1 | 5/2019 | Collin et al. |
| 2020/0278205 A1* | 9/2020 | Kraver ................ G01C 25/005 |
| 2020/0400433 A1* | 12/2020 | Aaltonen ........... G01C 19/5776 |
| 2020/0408523 A1 | 12/2020 | Fang et al. |
| 2020/0408524 A1 | 12/2020 | Hu et al. |

OTHER PUBLICATIONS

Maeda, Daisuke, et al: MEMS Gyroscope With Less Than 1-deg/h Bias Instability Variation in Temperature Range From −40 °C to 125 °C, IEEE Sensors Journal, vol. 18, No. 3, Feb. 1, 2018, pp. 1006-1015.

Shaeffer, Derek K.: "MEMS Inertial Sensors: A Tutorial Overview," IEEE Communications Magazine, Apr. 2013, pp. 100-109.

Sun, X, et al: "Stability and Resolution Analysis of a Phase-Locked Loop Natural Frequency Tracking System for MEMS Fatigue Testing," Journal of Dynamic Systems, Measurement, and Control, Dec. 2002, vol. 124, pp. 599-605.

Bu, Feng, et al: "MEMS Gyroscope Automatic Real-Time Mode-Matching Method Based on Phase-Shifted 45o Additional Force Demodulation," MDPI, Sep. 7, 2018, 16 pages, 2018.

Zhazaaleh, Shadi, et al: "Vulnerability of MEMS Gyroscopes to Targeted Acoustic Attacks," IEEE Access, Jul. 5, 2019, 10 pages, 2019.

* cited by examiner

MEMS GYROSCOPE SELF-TEST USING A TECHNIQUE FOR DEFLECTION OF THE SENSING MOBILE MASS

TECHNICAL FIELD

The present invention generally relates to a microelectromechanical system (MEMS) sensor of a gyroscope type and, in particular, to a technique for performing a self-test on the MEMS gyroscope.

BACKGROUND

A capacitive microelectromechanical system (MEMS) gyroscope sensor is a complex electromechanical structure that includes two masses that are moveable with respect to a stator body and are coupled to one another so as to have a relative degree of freedom. The two mobile masses are both capacitively coupled to the stator body. A first one of the mobile masses (referred to as the driving mass) is dedicated to driving and is kept in oscillation at a resonance frequency. The second one of the mobile masses (referred to as the sensing mass) is drawn along in oscillating motion due to the coupling to the driving mass. In the case of a rotation of the structure with respect to a predetermined gyroscope axis with an angular velocity, the sensing mass is subjected to a Coriolis force proportional to the angular velocity itself. A change in capacitance with respect to the sensing mass is sensed in order to detect the angular motion (rotation).

FIG. 1 shows a block diagram of a MEMS gyroscope sensor 10. The sensor 10 includes a MEMS microstructure 12 with a stator body, a driving mass 14 and a sensing mass 16. For simplicity, the MEMS microstructure 12 illustrates the case of a uniaxial gyroscope in which only one sensing mass 16 is present, although the configuration and operation is equally applicable to multi-axial gyroscopes with multiple sensing masses. The driving mass 14 is elastically constrained to the stator body so as to be able to oscillate about a rest position according to one degree of freedom shown by the X-axis (also referred to as the driving axis). In this regard, the driving mass and stator body define a resonant mechanical system with a resonant frequency. The sensing mass 16 is mechanically coupled to the driving mass 14 so as to be driven in motion according to the same degree of freedom (i.e., in the X-axis). Moreover, the sensing mass 16 is elastically coupled to the driving mass 14 so as to oscillate in turn with respect to the driving mass according to another degree of freedom shown by the Y-axis (also referred to as the sensing axis).

The driving mass 14 and sensing mass 16 are capacitively coupled to the stator body. In particular, the driving mass 14 is capacitively coupled to the stator body through a set of driving capacitors 20 which are connected to drive actuation electrodes and a set of drive sensing capacitors 22 which are connected to drive sense electrodes. The driving capacitors 20 are configured to respond to an applied differential oscillating drive signal Ds by applying an electrostatic force to induce oscillatory movement of the mobile masses in the X-axis. The drive sensing capacitors 22 are configured such that their capacitance depends in a differential way on the position of the driving mass 14 with respect to the stator body relative to the X-axis. The sensing mass 16 is capacitively coupled to the stator body through a set of sensing capacitors 24 which are connected to sensing electrodes. The sensing capacitors 24 are configured such that their capacitance depends in a differential way on the position of the sensing mass 16 with respect to the stator body relative to the Y-axis, and thus signals generated by the sensing capacitors 24 are indicative of movement relative to the Y-axis.

An application specific integrated circuit (ASIC) is electrically connected to the MEMS microstructure 12. The ASIC of the sensor 10 includes a driving circuit 30 having an input coupled to the drive sense electrodes for the drive sensing capacitors 22 to receive a differential drive sense signal Dss and an output coupled to the drive actuation electrodes for the driving capacitors 20 to apply the drive signal Ds. This coupling in feedback forms an oscillating microelectromechanical loop that is configured to keep the driving mass 14 in oscillation at the resonance frequency with a controlled amplitude. The ASIC of the sensor 10 further includes a sensing circuit 40 having a first input coupled to the drive sense electrodes for the drive sensing capacitors 22 and a second input coupled to the sensing electrodes for the sensing capacitors 24. The sensing circuit 40 receives a differential sense signal Ss generated by the sensing capacitors 24 and indicative of displacement of the sensing mass 16 relative to the Y-axis, demodulates the differential sense signal Ss in response to the differential drive sense signal Dss generated by the drive sensing capacitors 22, and outputs a signal indicative of sensed angular velocity (AVout) as a result of that demodulation.

Imperfections in the elastic connections between the mobile masses 14 and 16 and the stator body may result in oscillation which does not perfectly align with the X-axis. This defect may produce a force having a component directed along the Y-axis and, as a result thereof, introduce a signal component at the input of the sensing circuit 40 with a phase offset of 90° relative to the modulated angular velocity component. This is referred to in the art as quadrature error.

To address the issue of quadrature error, the system 10 includes quadrature error compensation control. The sensing mass 16 is further capacitively coupled to the stator body through a set of quadrature error compensation capacitors 26 connected to quadrature error compensation electrodes. The quadrature error compensation capacitors 26 are configured to respond to an applied quadrature error compensation signal QCs by applying an electrostatic force on the sensing mass 16 to counteract the force which induces the quadrature error. The ASIC of the sensor 10 further includes a quadrature error compensation circuit 50 having an input coupled to the sensing electrodes for the sensing capacitors 24 to receive the differential sense signal Ss, an input configured to receive a quadrature-phase drive sense signal qDssd and an output coupled to the quadrature error compensation electrodes for the quadrature error compensation capacitors 26 to apply the differential quadrature error compensation signal QCs. This coupling in feedback forms a microelectromechanical loop that is configured to ensure that the induced oscillation of the sensing mass 16 has no quadrature error.

As with practically any integrated circuit device, the MEMS gyroscope sensor 10 and, in particular, the MEMS microstructure 12 is subject to wear over time which can reduce reliability and jeopardize operation. This is a critical concern because it is well known to utilize the MEMS gyroscope sensor in safety critical applications such as with the passenger safety system of an automobile. For example, the MEMS accelerometer sensor may operate to assist with electronic stability control functions, mechanical fault detection and crash detection (for triggering airbag deployment and/or seat belt tensioning). It is accordingly imperative that the MEMS gyroscope sensor function properly and that a damaged or inoperative sensor be promptly detected. There is accordingly a need in the art for techniques for self-testing of the MEMS gyroscope sensor, for example, at the time of vehicle start-up, in order to ensure proper sensor operation.

SUMMARY

In an embodiment, a self-testing scheme uses the quadrature error compensation functionality of a microelectromechanical system (MEMS) gyroscope sensor to excite the sensing mass in a mode of operation where the control loop for quadrature error compensation is opened. The excitation of the sensing mass is not compensated for in the open control loop condition and as a result generates a quadrature error that is sensed to generate a quadrature error signal. Fault detection is performed by processing in-phase and quadrature phase components of the quadrature error signal. In one fault detection test, the magnitude of the in-phase component is compared to an expected magnitude due the excitation of the sensing mass. In another fault detection test, the magnitude of the in-phase component is compared to the magnitude of the quadrature phase component. A fault is generated if either comparison is not satisfied.

In an embodiment, a method is presented for self-testing a microelectromechanical system (MEMS) gyroscope sensor having a sensing mass and a quadrature error compensation control loop for applying a force to the sensing mass to cancel quadrature error. The method comprises: opening the quadrature error compensation control loop; applying an additional force to produce a physical displacement of the sensing mass; sensing a quadrature error due to the physical displacement of the sensing mass in response to the applied additional force; comparing the sensed quadrature error to an expected value corresponding to the applied additional force; and generating a fault alert if the comparison is not satisfied.

BRIEF DESCRIPTION OF THE DRAWINGS

For a better understanding of the embodiments, reference will now be made by way of example only to the accompanying figures in which.

DETAILED DESCRIPTION

Figure 1:
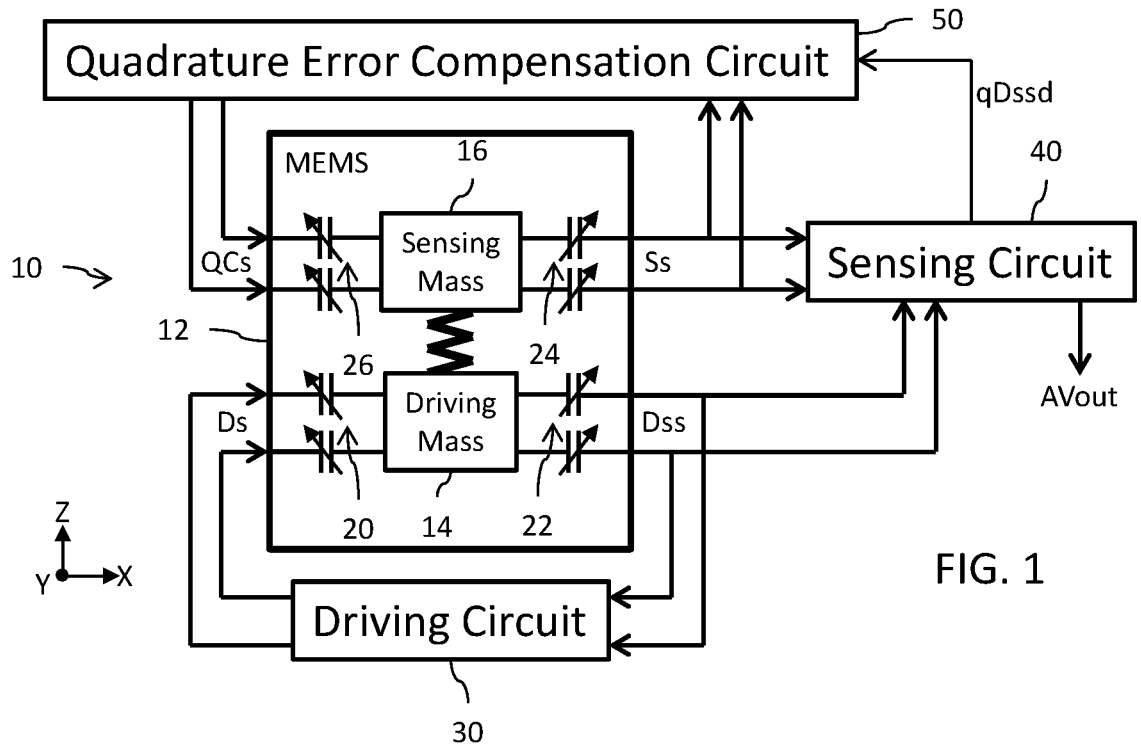
FIG. 1 is a block diagram of a MEMS gyroscope sensor.
Figure 2:
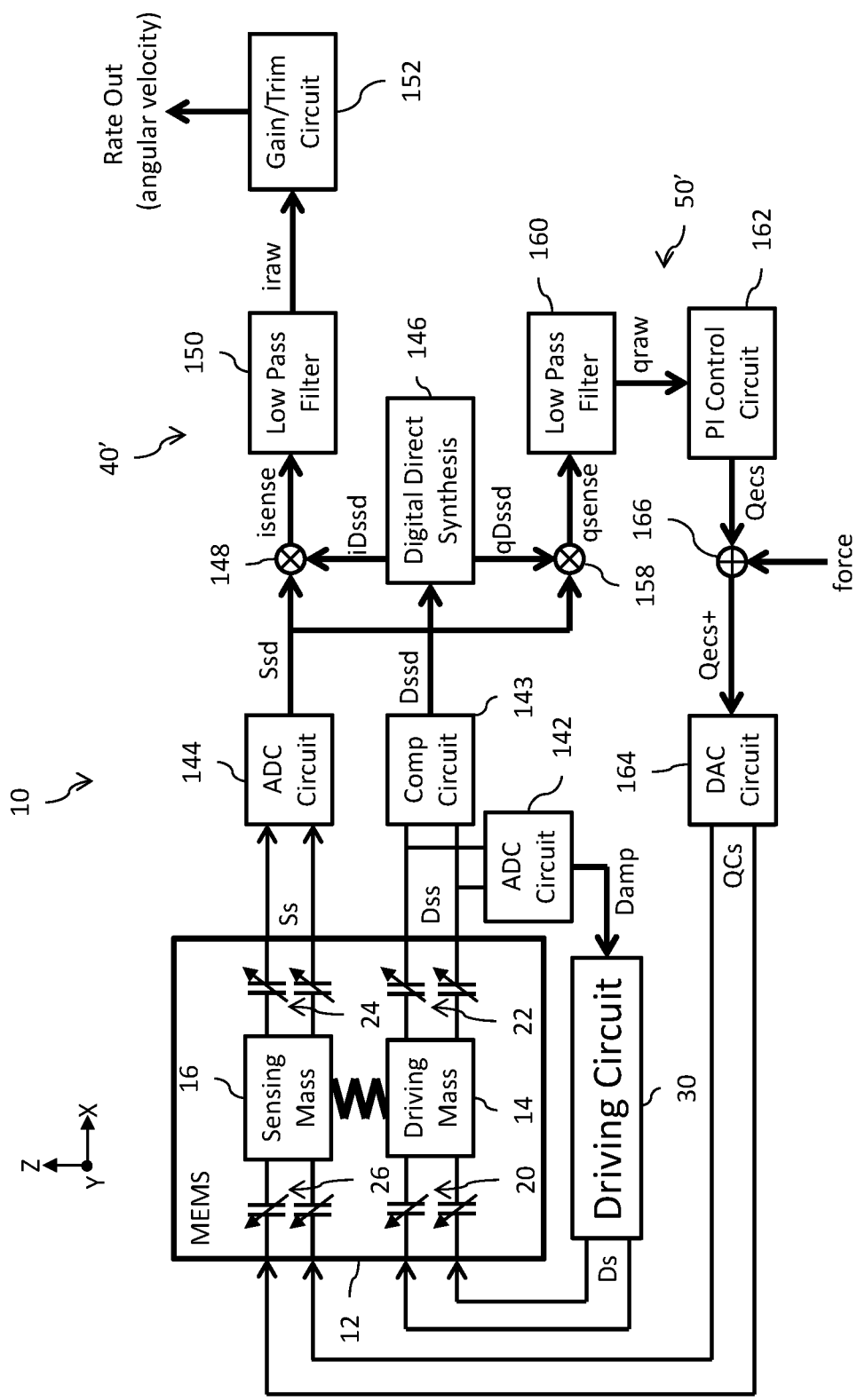
FIG. 2 is a block diagram of a MEMS gyroscope sensor with details for a sensing circuit and a quadrature error compensation circuit.

Reference is now made to FIG. 2 which shows a block diagram of a MEMS gyroscope sensor 10 with details for a sensing circuit 40' and a quadrature error compensation circuit 50'. Like references in FIGS. 1 and 2 refer to same or similar components, and for the sake of brevity the description of those same or similar components will not be repeated.

A first analog to digital converter (ADC) circuit 142 converts the analog differential drive sense signal Dss to a digital amplitude sense signal Damp for processing by the driving circuit 30. The first ADC circuit 142 comprises a charge-to-voltage converter circuit functioning to convert the charge on the drive sensing capacitors 22 to an analog voltage which is then converted to a corresponding digital signal. The digital amplitude sense signal Damp provides information concerning the amplitude of oscillation of the driving mass 14, and this amplitude information is fed back to the driving circuit 30 for use in generating the driving signal Ds for controlling oscillation of the driving mass 14.

The sensing circuit 40' has a first input coupled to the drive sense electrodes for the drive sensing capacitors 22 to receive the differential drive sense signal Dss. A comparator (Comp) circuit 143 compares the differential components of the differential drive sense signal Dss to generate a digital differential drive sense signal Dssd. In the context of the system 10, the digital differential drive sense signal Dssd provides a reference clock phase for a demodulation operation to be discussed in detail herein. The sensing circuit 40' has a second input coupled to the sensing electrodes for the sensing capacitors 24 to receive the differential sense signal Ss. A second analog to digital converter circuit 144 converts the analog differential sense signal Ss to a digital differential sense signal Ssd. The second ADC circuit 144 comprises a charge-to-voltage converter circuit functioning to convert the charge on the sensing capacitors 24 to an analog voltage which is then converted to a corresponding digital signal. In the context of the system 10, digital differential sense signal Ssd is quadrature demodulated in response to the reference clock phase in accordance with the digital demodulation operation to be discussed in detail herein.

A digital direct synthesis (DDS) circuit processes the digital differential drive sense signal Dssd to generate an in-phase drive sense signal iDssd. This signal is the in-phase component of the reference clock phase in the quadrature demodulation of the digital differential sense signal Ssd. A first demodulator 148 functions to demodulate the digital differential sense signal Ssd using the in-phase drive sense signal iDssd to produce an in-phase sense signal (isense). The in-phase sense signal isense is filtered by low pass filter 150 to generate raw in-phase data (iraw) to which a gain/trim adjustment is made by circuit 152 to produce a rate output signal that is indicative of the position of the sensing mass 16 with respect to the stator body relative to the Y-axis which corresponds to the sensed angular velocity of the sensor 10.

The processing operation performed by the DDS circuit 146 on the digital differential drive sense signal Dssd further generates a quadrature-phase drive sense signal qDssd which is input to the quadrature error compensation circuit 50'. This signal is the quadrature-phase component of the reference clock phase in the quadrature demodulation of the digital differential sense signal Ssd. The quadrature error compensation circuit 50' further receives the digital differential sense signal Ssd and a second demodulator 158 functions to demodulate the digital differential sense signal Ssd using the quadrature-phase drive sense signal qDssd to produce a quadrature-phase sense signal (qsense). The quadrature-phase sense signal qsense is filtered by low pass filter 160 to generate raw quadrature-phase data (qraw). The raw quadrature-phase data qraw is processed in a proportional-integral (PI) controller 162 that operates to continuously calculate an error between the raw quadrature-phase data qraw (i.e., the sensed process variable) and a desired set point value (for zero quadrature error) and then apply a correction based on proportional and integral terms as known to those skilled in the art to generate a quadrature error compensation signal Qecs for driving the calculated error towards zero. A digital to analog converter (DAC) circuit 164 converts the digital value of the quadrature error compensation signal Qecs to generate the differential quadrature error compensation signal QCs. This differential quadrature error compensation signal QCs is a differential voltage signal applied to the quadrature error compensation capacitors 26. In response thereto, an electrostatic force is applied to the sensing mass 16 by the quadrature error compensation capacitors 26, where that electrostatic force counteracts the quadrature error force on the MEMS microstructure 12. The operation performed here by the proportional-integral controller 162 in the closed control loop for the quadrature error compensation circuit 50' is essentially to generate the quadrature error compensation signal Qecs such that the error in the quadrature-phase data qraw value is driven to zero.

The quadrature error compensation circuit 50' may further include a summing circuit 166 to add a force signal to the quadrature error compensation signal Qecs, generating an offset quadrature error compensation signal Qecs+, where the offset quadrature error compensation signal Qecs+ is converted by the digital to analog converter circuit 164 into the differential quadrature error compensation signal QCs. In normal mode, this force signal corresponds to the required force necessary to zero-out the quadrature error on a given MEMS sensor as fabricated. In other words, this is the force needed to cancel the inherent quadrature error of the fabricated MEMS sensor. The force signal can have any selected value, including zero. In an embodiment, the force signal represents a calibration value assigned in response to an initial (for example, factory) calibration of the MEMS gyroscope sensor 10 which is representative of an initial quadrature error.

Figure 3:
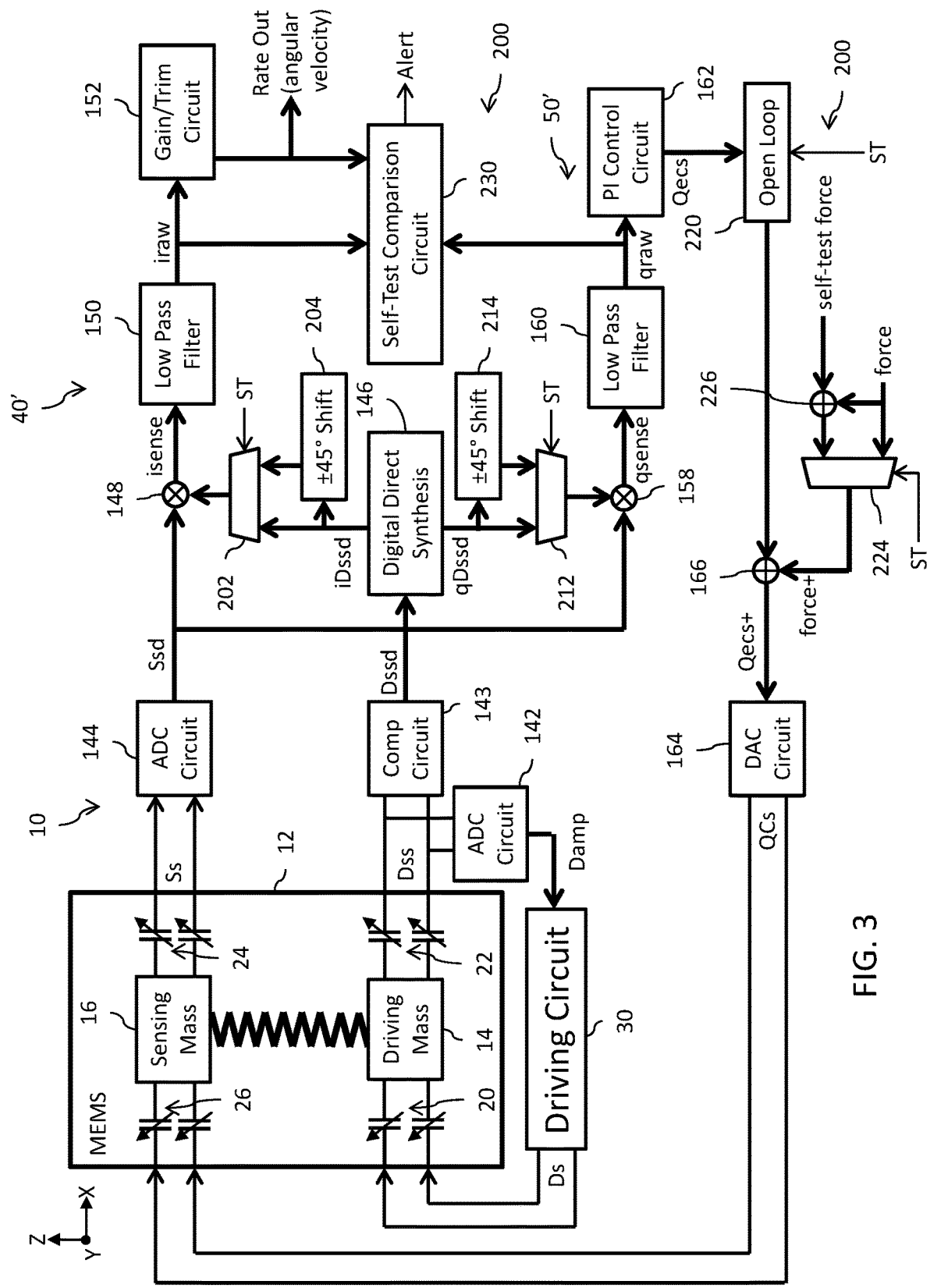
FIG. 3 is a block diagram of a MEMS gyroscope sensor with details for a self-testing circuit.

Reference is now made to FIG. 3 which shows a block diagram of a MEMS gyroscope sensor 10 with details for a self-testing circuit 200. Like references in FIGS. 1, 2 and 3 refer to same or similar components, and for the sake of brevity the description of those same or similar components will not be repeated.

The self-testing circuit 200 modifies the sensing circuit 40' from what is shown in FIG. 2 to support application of a selective phase shift to the in-phase drive sense signal iDssd before application to the first demodulator 148. In response to a deassertion of a self-testing control signal ST, a multiplexer 202 functions to select the in-phase drive sense signal iDssd as output from the low pass filter 146 for application to the first demodulator 148, and this operational configuration corresponds to the configuration shown in FIG. 2. Conversely, in response to an assertion of the self-testing control signal ST, the multiplexer 202 functions to select a phase shifted version of the in-phase drive sense signal iDssd for application to the first demodulator 148. A phase shifting circuit 204 applies the selected phase shift to the in-phase drive sense signal iDssd. In a preferred embodiment, the selected phase shift is ±45°.

The self-testing circuit 200 further modifies the quadrature error compensation circuit 50' from what is shown in FIG. 2 to support application of a selective phase shift to the quadrature-phase drive sense signal qDssd before application to the second demodulator 158. In response to a deassertion of the self-testing control signal ST, a multiplexer 212 functions to select the quadrature-phase drive sense signal qDssd as output from the low pass filter 146 for application to the second demodulator 158, and this operational configuration corresponds to the configuration shown in FIG. 2. Conversely, in response to an assertion of the self-testing control signal ST, the multiplexer 212 functions to select a phase shifted version of the quadrature-phase drive sense signal qDssd for application to the second demodulator 158. A phase shifting circuit 214 applies the selected phase shift to the quadrature-phase drive sense signal qDssd. In a preferred embodiment, the selected phase shift is ±45°, and it will be noted that the phase shifting circuits 204 and 214 will apply the same phase shift (i.e., either −45° or +45°.

The quadrature error compensation circuit 50' is further modified by the self-testing circuit 200 to include a functionality for selectively opening the control loop. In response to a deassertion of the self-testing control signal ST, an open loop control circuit 220 passes the quadrature error compensation signal Qecs output from the PI controller 162 to the first input of the summing circuit 166, and this operational configuration corresponds to the configuration shown in FIG. 2. In this mode of operation, the control loop for the quadrature error compensation circuit 50' is closed and the compensation for quadrature error is applied in the manner discussed above in connection with FIG. 2. Conversely, in response to an assertion of the self-testing control signal ST, the open loop control circuit 220 blocks the quadrature error compensation signal Qecs from being applied to the first input of the summing circuit 166. In this mode of operation, the control loop for the quadrature error compensation circuit 50' is open and no compensation for quadrature error is applied. The reason for this, as will be explained in more detail below, is to enable a forced displacement of the sensing mass 16 to be made during self-testing without the quadrature error compensation circuit 50' operating to try to correct for the quadrature error which results from that forced displacement.

The self-testing circuit 200 still further modifies the quadrature error compensation circuit 50' to support application of a selective magnitude of the force signal (force+) to the second input of the summing circuit 166. In response to a deassertion of the self-testing control signal ST, a multiplexer 224 functions to select the force signal for application to the summing circuit 166, and this operational configuration corresponds to the configuration shown in FIG. 2. Conversely, in response to an assertion of the self-testing control signal ST, the multiplexer 224 functions to select a magnitude shifted force signal for application to the summing circuit 166. A summing circuit 226 adds a self-testing force signal to the force signal to generate the selective force signal (force+) that is selected by the multiplexer 224 and applied to the second input of the summing circuit 166.

To detect the presence of a fault, the self-testing circuit 200 includes a self-test comparison circuit 230 coupled to receive the rate out signal generated from the gain and trim adjustment of the raw in-phase data iraw. In a primary comparison test for detecting a fault, the self-test comparison circuit 230 compares the rate out signal to a value corresponding to the self-testing force signal. If the rate out signal does not equal the value (±a first threshold), this is indicative of the presence of a fault and the fault alert signal (Alert) is asserted (i.e., Alert if rate out≠value±threshold1). This test is designed to determine whether the mobile masses of the MEMS microstructure 12 are functioning properly as well as to test whether the in-phase signal processing channel is functioning properly.

As an alternative, the raw in-phase data (iraw) from the low pass filter 150 is compared by the self-test comparison circuit 230 to a value corresponding to the self-testing force signal. If the raw in-phase data iraw does not equal the value (±a second threshold), this is indicative of the presence of a fault and the fault alert signal (Alert) is asserted (i.e., Alert if iraw≠value±threshold2). Again, this test is designed to determine whether the mobile masses of the MEMS microstructure 12 are functioning properly as well as to test whether the in-phase signal processing channel is functioning properly.

If the foregoing test is passed, then the self-test comparison circuit 230 performs a further comparison test. The self-test comparison circuit 230 is also coupled to receive the raw quadrature-phase data (qraw) from the low pass filter 160. In the further comparison test for detecting a fault, the self-test comparison circuit 230 determines a difference between the raw in-phase data iraw and the raw quadrature-phase data qraw and compares the difference to a third threshold. If the magnitude of the determined difference exceeds the third threshold, this is indicative of the presence of a fault and the fault alert signal (Alert) is asserted (i.e., Alert if abs(iraw−qraw)>threshold3). This test is designed to determine whether the quadrature-phase signal processing channel is functioning properly.

Figure 4:
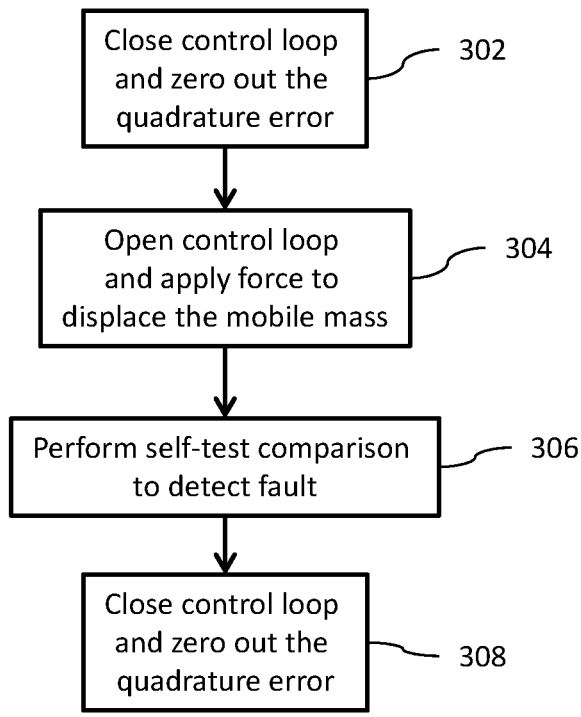
FIG. 4 is a flow diagram for self-testing operation.

Reference is now made to FIG. 4 which shows a flow diagram for self-testing operation. In step 302, the self-testing control signal ST is deasserted. In response thereto, the control loop for the quadrature error compensation circuit 50' is closed by the loop control circuit 220, the in-phase drive sense signal iDssd is applied to the first demodulator 148 by multiplexer 202, the quadrature-phase drive sense signal qDssd is applied to the second demodulator 158 by multiplexer 212, and the force signal is applied to the second input of the summing circuit 166 by multiplexer 224. Through the closed control loop the quadrature error is sensed and the PI controller 162 operates to generate the quadrature error compensation signal Qecs to zero out the sensed quadrature error. The quadrature error compensation signal Qecs is converted to the differential quadrature error compensation signal QCs for application to the quadrature error compensation capacitors 26 where an electrostatic force is applied to the sensing mass 16 to offset the movement of the sensing mass 16 which induces the quadrature error.

In step 304, the self-testing control signal ST is asserted. In response thereto, the control loop for the quadrature error compensation circuit 50' is opened by the loop control circuit 220, the ±45° phase shifted in-phase drive sense signal iDssd is applied to the first demodulator 148 by multiplexer 202, the ±45° phase shifted quadrature-phase drive sense signal qDssd is applied to the second demodulator 158 by multiplexer 212, and the magnitude shifted force (force+self-test force) signal is applied to the second input of the summing circuit 166 by multiplexer 224. Because of the presence of the additional self-test force signal, there is an additional electrostatic force applied to the sensing mass 16 in response to the differential quadrature error compensation signal QCs. This produces a forced physical displacement of the sensing mass 16 by an amount corresponding to the additional self-test force signal. It will be noted that this forced physical displacement is in addition to any displacement needed by operation of step 302 to cancel the inherent quadrature error in the MEMS sensor. With the control loop for the quadrature error compensation circuit 50' in the open state, there is no compensating action taken to correct for this forced physical displacement of the sensing mass 16.

In step 306, the forced physical displacement of the sensing mass 16 due to the self-testing operation is sensed and compared to detect fault. The 45° phase shift applied by the phase shifting circuits 204 and 214 functions to shift the reference clock phase for the operation of the first and second demodulators 148 and 158, respectively, such that the in-phase and quadrature-phase components of the demodulated digital differential sense signal Ssd both will have non-zero magnitudes (and should ideally have substantially equal magnitudes). The self-test comparison circuit 230 performs a first comparison of the rate out signal to a value corresponding to the self-testing force signal. In effect, this comparison determines whether the MEMS microstructure 12 is working properly if the sensed forced physical displacement of the sensing mass 16 corresponds to a desired forced physical displacement set by the value of the self-testing force signal. Ideally, the rate out signal should be equal to the value corresponding to the self-testing force signal to pass. In practicality, however, it is sufficient for the self-test to pass if the sensed forced physical displacement of the sensing mass 16 is substantially near to the desired forced physical displacement, and this is satisfied when the rate out signal equals the value±the first threshold.

As noted above, alternatively the foregoing self test may be performed by comparing in-phase component of the demodulated digital differential sense signal Ssd, provided by the signal isense and the raw in-phase data (iraw), to a value corresponding to the self-testing force signal. Ideally, the raw in-phase data iraw should be equal to the value for the self-test to pass. In practicality, however, it is sufficient for the self-test to pass if the sensed forced physical displacement of the sensing mass 16 is substantially near to the desired forced physical displacement, and this is satisfied when the raw in-phase data iraw equals the value±the second threshold.

If the first self test is passed, the operation of step 306 further includes a comparison of the in-phase component of the demodulated digital differential sense signal Ssd, provided by the signal isense and the raw in-phase data (iraw), to the quadrature-phase component of the demodulated digital differential sense signal Ssd, provided by the signal qsense and the raw quadrature-phase data (qraw). Ideally, this comparison determines whether the magnitudes of the in-phase and quadrature-phase components are equal so as to show that both the in-phase signal processing channel and the quadrature-phase processing channel are operating properly and for the self-test to pass. In practicality, however, it is sufficient for the self-test to pass if a difference in magnitudes between the in-phase and quadrature-phase components is less than the third threshold.

In step 308, the self-testing control signal ST is deasserted. In response thereto, the control loop for the quadrature error compensation circuit 50' is closed by the loop control circuit 220 and the circuit operates to zero out the quadrature error which now has an additional error component due to the forced physical displacement of the sensing mass 16 in step 302. If the zeroing out of the quadrature error is successful, then self-testing operation is passed. This step is important in order to show non-faulty operation because the system should effectively zero out the quadrature error which has been introduced in step 304 as well as the inherent quadrature error present in the MEMS system.

Figure 5A:
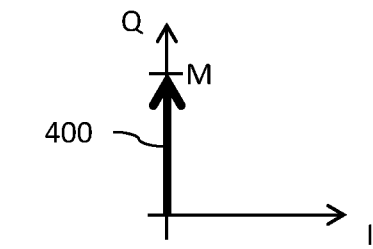
FIGS. 5A-5B show vector diagrams.
Figure 5B:
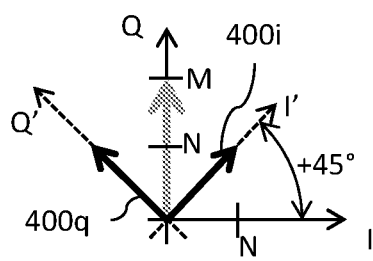

A better understanding of the self-testing operation may be had by reference to the following example. After step 302 is completed, the magnitude of the signal qsense and the raw quadrature-phase data (qraw) will be substantially zero as the quadrature offset has been canceled by the closed control loop processing by the quadrature error compensation circuit 50'. At step 304, the control loop is opened in response to assertion of the self-testing control signal ST and the self-test force signal is applied to the second input of the summing circuit 166 by multiplexer 224. The magnitude of the self-test force signal is selected to induce a certain degree of a forced physical displacement of the sensing mass 16 which will be sensed by the front end of the quadrature error compensation circuit 50' as a quadrature error. The magnitude M of the sensed quadrature error present in the digital differential sense signal Ssd signal is detectable in the qsense and the raw quadrature-phase data (qraw) signals following demodulation. FIG. 5A shows a vector diagram showing the detected quadrature error 400 with a magnitude M and a component only in the quadrature-phase Q (i.e., no component in the in-phase I). The application of a +45° phase shift to the in-phase drive sense signal iDssd and quadrature-phase drive sense signal qDssd shifts the reference clock phase for the demodulation operation producing a rotation of the vector diagram as shown in FIG. 5B. The detected quadrature error 400 now has a component 400$i$ in the in-phase I' with a magnitude N and a component 400$q$ in the quadrature-phase Q' with a magnitude N, where N=M/(sqrt 2). The in-phase component 400$i$ is presented by the isense and the raw in-phase data (iraw) signals and the quadrature phase component 400$q$ is presented by the qsense and the raw quadrature-phase data (qraw) signals. The processing of these signals in self-testing is used to reveal the presence of fault.

The selected magnitude of the self-test force signal is expected to produce the quadrature error present in the digital differential sense signal Ssd signal with a magnitude M'. With a +45° phase shift, this means that the corresponding in-phase component 400$i$ and quadrature phase component 400$q$ should each have a non-zero magnitude N', where N'=M'/(sqrt 2). The first comparison performed by the self-test comparison circuit 230 corresponds to a determination as to whether the magnitude Ni of the in-phase component 400$i$ is substantially equal to the expected magnitude N'. In this context, the magnitude Ni is substantially equal to the magnitude N' if the magnitude Ni is within the first threshold of the magnitude N' (i.e., Ni=N'±threshold1). The second comparison performed by the self-test comparison circuit 230 determines whether the magnitude Ni of the in-phase component 400$i$ and the magnitude Nq of the quadrature-phase component 400$q$ are substantially equal. In this context, magnitudes are substantially equal if a difference between the magnitude Ni of the in-phase component 400$i$ and the magnitude Nq of the quadrature-phase component 400$q$ is less than the second threshold (i.e., abs(Ni−Nq)<threshold2).

The self-testing scheme uses the quadrature error compensation functionality of the MEMS sensor 10 to excite the sensing mass 16 in a mode of operation where the control loop for quadrature error compensation is opened. The excitation of the sensing mass is not compensated for in the open control loop condition and as a result generates a quadrature error that is sensed and converted to a quadrature error signal for fault detection processing. In particular, in-phase and quadrature phase components of the quadrature error signal are processed to make the fault detection. In one fault detection test, the magnitude of the in-phase component is compared to an expected magnitude due the excitation of the sensing mass. In another fault detection test, the magnitude of the in-phase component is compared to the magnitude of the quadrature phase component. A fault is generated if either comparison is not satisfied.

Figure 6:
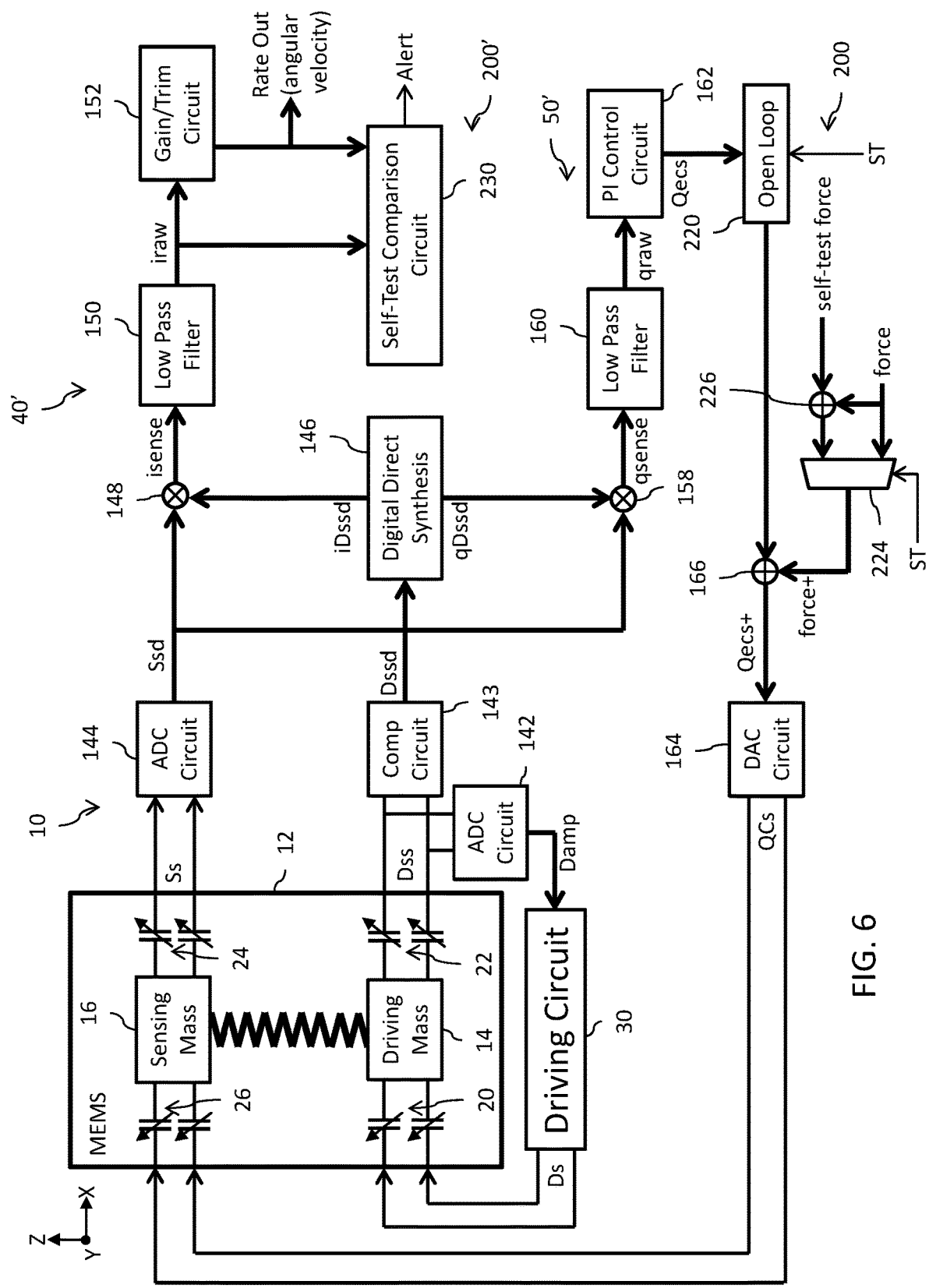
FIG. 6 is a block diagram of a MEMS gyroscope sensor with details for a self-testing circuit.

Reference is now made to FIG. 6 which shows a block diagram of a MEMS gyroscope sensor 10 with details for a self-testing circuit 200'. Like references in FIGS. 1, 2, 3 and 6 refer to same or similar components, and for the sake of brevity the description of those same or similar components will not be repeated.

The implementation shown in FIG. 6 is a simplification of the implementation shown in FIG. 3. The selective phase shifting operation for the reference clock phase is eliminated. Furthermore, comparison of the iraw and qraw data is eliminated.

The self-testing circuit 200' supports application of a selective magnitude of the force signal (force+) to the second input of the summing circuit 166. In response to a deassertion of the self-testing control signal ST, a multiplexer 224 functions to select the force signal for application to the summing circuit 166, and this operational configuration corresponds to the configuration shown in FIG. 2. Conversely, in response to an assertion of the self-testing control signal ST, the multiplexer 224 functions to select a magnitude shifted force signal for application to the summing circuit 166. A summing circuit 226 adds a self-testing force signal to the force signal to generate the selective force signal (force+) that is selected by the multiplexer 224 and applied to the second input of the summing circuit 166.

The self-test comparison circuit 230 is coupled to receive the rate out signal generated from the gain and trim adjustment of the raw in-phase data iraw. This rate out signal is compared by the self-test comparison circuit 230 to a value corresponding to the self-testing force signal. If the rate out signal does not equal the value (±a first threshold), this is indicative of the presence of a fault and the fault alert signal (Alert) is asserted (i.e., Alert if rate out≠value±threshold1). This test is limited to detecting whether the mobile masses of the MEMS microstructure 12 and in-phase signal processing channel are functioning properly.

As an alternative, the self-test comparison circuit 230 may instead receive the raw in-phase data (iraw) from the low pass filter 150 for comparison against a value corresponding to the self-testing force signal. If the raw in-phase data iraw does not equal the value (±a second threshold), this is indicative of the presence of a fault and the fault alert signal (Alert) is asserted (i.e., Alert if iraw≠value±threshold2).

The self-testing functionality implemented as shown in FIG. 6 has the benefit of simplicity over the FIG. 3 solution, but has drawbacks because it does not test whether the phase shifting function or the in-phase signal processing channel are functioning properly.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method for self-testing a microelectromechanical system (MEMS) gyroscope sensor having a sensing mass and a quadrature error compensation control loop for applying a force to the sensing mass to cancel quadrature error, comprising:
opening the quadrature error compensation control loop;
applying an additional force to produce a physical displacement of the sensing mass;
sensing a quadrature error due to the physical displacement of the sensing mass in response to the applied additional force;
comparing the sensed quadrature error to an expected value corresponding to the applied additional force; and
generating a fault alert if the comparison is not satisfied.

2. The method of claim 1, wherein sensing the quadrature error comprises generating a quadrature error signal having an in-phase component and a quadrature phase component, and wherein comparing comprises comparing a magnitude of one of the in-phase and quadrature-phase components to a magnitude expected due to the physical displacement of the sensing mass, and wherein generating comprises asserting the fault alert if the magnitudes are not substantially equal.

3. The method of claim 1, wherein sensing the quadrature error comprises generating a quadrature error signal having an in-phase component and a quadrature phase component, and wherein comparing comprises comparing a magnitude of the in-phase component to a magnitude of the quadrature-phase component, and wherein generating comprises asserting the fault alert if the magnitudes are not substantially equal.

4. The method of claim 1, wherein the MEMS gyroscope sensor further has a driving mass coupled to the sensing mass, the method further comprising:
    applying force to the driving mass to induce oscillation;
    sensing oscillation of the driving mass to generate a reference clock phase;
    sensing movement of the sensing mass to generate a sensing signal; and
    demodulating the sensing signal in response to the reference clock phase to generate the quadrature error.

5. The method of claim 4, wherein demodulating the sensing signal comprises generating an in-phase component and a quadrature phase component for the quadrature error.

6. The method of claim 5, wherein comparing comprises comparing a magnitude of one of the in-phase and quadrature-phase components to a magnitude expected due to the physical displacement of the sensing mass, and wherein generating comprises asserting the fault alert if the magnitudes are not substantially equal.

7. The method of claim 5, wherein comparing comprises comparing a magnitude of the in-phase component to a magnitude of the quadrature-phase component, and wherein generating comprises asserting the fault alert if the magnitudes are not substantially equal.

8. The method of claim 5, wherein the reference clock phase has an in-phase component and a quadrature-phase component, the method further comprising phase shifting both the in-phase component and a quadrature-phase component of the reference clock phase so that both the in-phase component and quadrature phase component of the quadrature error have non-zero magnitudes.

9. The method of claim 8, wherein comparing comprises comparing the non-zero magnitudes of the in-phase component and quadrature-phase component of the quadrature error, and wherein generating comprises asserting the fault alert if the non-zero magnitudes are not substantially equal.

10. The method of claim 1, further comprising, prior to opening, closing the quadrature error compensation control loop to zero out quadrature error.

11. The method of claim 1, wherein sensing the quadrature error comprises generating a quadrature error signal having an in-phase component, and further comprising converting the in-phase component to a rate signal indicative of angular velocity, wherein comparing comprises comparing a magnitude of the rate signal to a magnitude expected due to the physical displacement of the sensing mass, and wherein generating comprises asserting the fault alert if the magnitudes are not substantially equal.

12. A method for self-testing a microelectromechanical system (MEMS) gyroscope sensor, comprising:
    using a quadrature error compensation functionality of the MEMS gyroscope sensor to excite a sensing mass in a mode of operation where a control loop for quadrature error compensation is opened;
    sensing a quadrature error in the open control loop condition; and
    detecting fault in the MEMS gyroscope sensor by processing in-phase and quadrature phase components of the quadrature error.

13. The method of claim 12, wherein detecting fault comprises comparing a magnitude of the in-phase component to an expected magnitude due the excitation of the sensing mass and indicating a fault condition if the magnitudes are not substantially equal.

14. The method of claim 12, wherein detecting fault comprises comparing a magnitude of the in-phase component to a magnitude of the quadrature phase component indicating a fault condition if the magnitudes are not substantially equal.

15. A method for self-testing a microelectromechanical system (MEMS) gyroscope sensor having a sensing mass and a quadrature error compensation control loop for applying a quadrature error compensation force to the sensing mass to cancel quadrature error, comprising:
    opening the quadrature error compensation control loop to prevent application of the quadrature error compensation force;
    applying a testing force to the sensing mass in substitution for the quadrature error compensation force in order to produce a testing physical displacement of the sensing mass;
    sensing a quadrature error due to the testing physical displacement of the sensing mass in response to the applied testing force;
    comparing the sensed quadrature error to an expected value corresponding to the applied testing force; and
    generating a fault alert if the comparison is not satisfied.

16. The method of claim 15, wherein sensing the quadrature error comprises generating a quadrature error signal having an in-phase component and a quadrature phase component, and wherein comparing comprises comparing a magnitude of one of the in-phase and quadrature-phase components to a magnitude expected due to the testing physical displacement of the sensing mass, and wherein generating comprises asserting the fault alert if the magnitudes are not substantially equal.

17. The method of claim 15, wherein sensing the quadrature error comprises generating a quadrature error signal having an in-phase component and a quadrature phase component, and wherein comparing comprises comparing a magnitude of the in-phase component to a magnitude of the quadrature-phase component, and wherein generating comprises asserting the fault alert if the magnitudes are not substantially equal.

18. The method of claim 15, wherein sensing the quadrature error comprises generating a quadrature error signal having an in-phase component, and further comprising converting the in-phase component to a rate signal indicative of angular velocity, wherein comparing comprises comparing a magnitude of the rate signal to a magnitude expected due to the physical displacement of the sensing mass, and wherein generating comprises asserting the fault alert if the magnitudes are not substantially equal.

19. The method of claim 15, wherein the MEMS gyroscope sensor further has a driving mass coupled to the sensing mass, the method further comprising:
    applying force to the driving mass to induce oscillation;

sensing movement of the sensing mass to generate a sensing signal;

sensing oscillation of the driving mass to generate quadrature demodulation clock signals;

applying a phase shift to the quadrature demodulation clock signals when the quadrature error compensation control loop is opened; and quadrature demodulating the sensing signal using the phase shifted quadrature demodulation clock signals in response to the reference clock phase to generate said sensed quadrature error.

20. The method of claim 19, wherein phase shifting comprises applying a 45° phase shift.

21. The method of claim 19, wherein the sensed quadrature error comprises an in-phase component and a quadrature phase component of the demodulated sensing signal, and wherein comparing comprises comparing a magnitude of one of the in-phase and quadrature-phase components to a magnitude expected due to the testing physical displacement of the sensing mass, and wherein generating comprises asserting the fault alert if the magnitudes are not substantially equal.

22. The method of claim 19, wherein the sensed quadrature error comprises an in-phase component and a quadrature phase component of the demodulated sensing signal, and wherein comparing comprises comparing a magnitude of the in-phase component to a magnitude of the quadrature-phase component, and wherein generating comprises asserting the fault alert if the magnitudes are not substantially equal.

23. The method of claim 19, wherein the sensed quadrature error comprises an in-phase component and a quadrature phase component of the demodulated sensing signal, and wherein comparing comprises: converting the in-phase component to a rate signal indicative of angular velocity; and comparing a magnitude of the rate signal to a magnitude expected due to the physical displacement of the sensing mass, and wherein generating comprises asserting the fault alert if the magnitudes are not substantially equal.

24. The method of claim 15, further comprising, prior to opening quadrature error compensation control loop, using the closed quadrature error compensation control loop to zero out quadrature error.

* * * * *